** 3,149,461
COMPOSITE REACTION ENGINE FOR AIRCRAFT
WITH WIDE RANGES OF SPEED
Konrad Eichholtz, Dammarie-les-Lys, France, assignor to Société Nationale d'Etude et de Construction de Moteurs d'Aviation, Paris, France, a company of France
Filed Nov. 16, 1961, Ser. No. 152,897
Claims priority, application France, Nov. 18, 1960, 844,347
7 Claims. (Cl. 60—35.6)

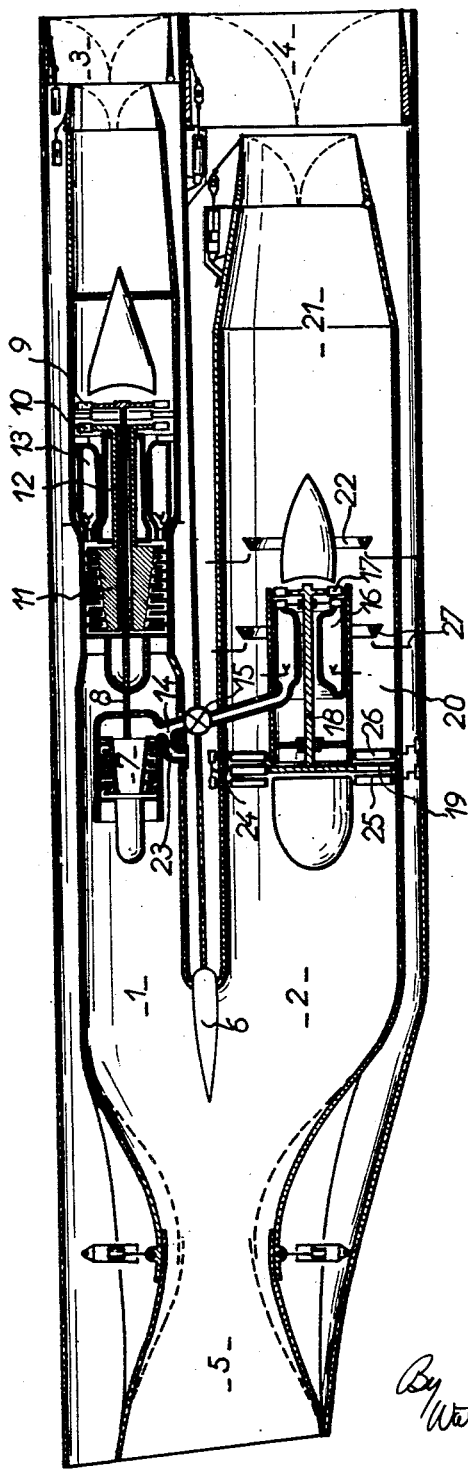

The present invention has for its object a composite jet engine which, with heating and re-heating, supplies a large thrust, especially when stationary and at supersonic speeds, and which can operate over the whole range of speeds with small specific consumption, even at small partial loads.

Jet engines of the composite or compound type, constituted by a turbo-jet and a ram-jet, are known. At highly supersonic speeds, the power of these engines is very great, especially by reason of the large flow-rate of air in the ram-jet, and their specific consumption can be low in consequence of the high compression in the intake stream of each channel of the engine. However, when the speed of flight decreases, the contribution of the ram-jet to the thrust of the engine diminishes, and when taking-off, the thrust, supplied solely by the turbo-jet, is small.

By-pass turbo-jet engines are also known, in which it is possible to obtain very favorable specific consumptions at sub-sonic and moderate supersonic speeds, the division of the stream of air passing through the engine into a generator flow and a power flow enabling the appropriate pressure ratio to be chosen for each. However, the great difference in the pressures which are created at high speeds of flight in the two flows gives rise to pressure losses in the case where the two flows are mixed before they are ejected from a single discharge-nozzle. Furthermore, a convergent-divergent discharge-nozzle with two coaxial outlets adjustable in flight is complicated and bulky, especially when after-burning devices are employed.

The compound jet engine forming the object of the present invention is designed so as to combine the favorable characteristics of the by-pass turbo-jet engine at the lower speeds with those of the combined turbo-jet and ram-jet at the higher speeds.

The engine according to the invention comprises at least two channels with two different flows. One of these channels is provided with a gas generator and the other, which essentially supplies the engine power, is equipped with a low-pressure compressor provided with a device which operates by variation of the axial speed to vary the flow-rate of the compressor and the ratio of pressures. The power for driving the low-pressure compressor is taken from the gas generator. In the power channel is also located a heating device. The two channels are equipped with convergent-divergent air-intakes, or with a common intake of the same type, and with convergent-divergent discharge-nozzles, the air-intakes or the common intake and the discharge-nozzles being adjustable when stationary and in flight. In the case of a common air-intake, an appropriate device such as a flap placed at the separation of the two flows, may be provided in order to distribute these two flows correctly in accordance with the ratio of the required rates of flow.

In one form of embodiment of the present invention, the useful power of the gas generator is absorbed by a turbo-compressor constituted by a free turbine driving a compressor and is transmitted pneumatically from the generator channel to the power channel, this third flow increasing at the same time the mass flow-rate of this latter channel. It is quite clear however that any other type of compressed air generator may also be employed.

The low-pressure compressor, housed in the power channel, comprises a stator with adjustable blades, a change in the setting of the blades enabling the axial speed of the flow to be varied. The upper limit of this speed is given by the admissible axial Mach number compatible with the speed of the compressor. This compressor is driven by a turbine supplied with air coming at an appropriate pressure from the generator channel, and previously heated in a combustion chamber.

On the downstream side of the turbine, the gases are delivered inside this channel into a mixing chamber into which is delivered the compressed air coming from the low-pressure compressor, and the turbine automatically establishes the same static pressure in the two flows. A heating device in the cold flow also enables the temperatures of the two flows to be made equal. Thus, the losses of pressure at the junction of the two flows are very small. In the channel, there is also arranged an after-burning device. The convergent-divergent discharge-nozzle will be regulated accordingly.

When stationary and at sub-sonic speeds and moderate supersonic speeds, the engine according to the invention is comparable to a by-pass turbo-jet. At full load and when working without heating of the cold flow and without after-burning, the specific consumption is small; with heating and after-burning, a large surplus of power can be obtained.

When comparing under similar conditions the two channels of the engine according to the invention with the two independent channels in simultaneous operation of a combined turbo and ram-jet, it is found that over a large range of temperatures of heating and re-heating, the additional compression due to the low-pressure compressor results in a smaller increase of entropy in the flow discharged from the power channel than in that of the ram-jet.

Furthermore, the losses in the turbine serving to absorb the useful power of the gas generator, cause a supplementary increase of entropy in the flow discharged from the generator channel which does not exist in that of the turbo-jet. For the whole range of speeds up to beyond the point of operation at which the admission pressure at the compressor of the gas generator is equal to the pressure downstream of its turbine, it is found that the sum of the increases of entropy in the two channels is less for the engine according to the invention than for the combined turbo and ram-jet used for comparison, which means that the engine of the present invention has a higher thermo-dynamic efficiency.

At highly supersonic speeds, the pressure in the two channels is very different, but the two discharge-nozzles can be regulated in consequence and can operate with the minimum loss. The operation of the power channel is very close to that of a ram-jet. In order to operate the engine at maximum power at these speeds of flight, with heating and after-burning, the flow-rate of the power channel can be substantially increased by increasing the setting angle of the blades of the stationary rows of the low-pressure compressor, in which the compression ratio decreases in this case to the vicinity of 1, the speed remaining appropriate.

By the elimination of the flow of the gas generator from the power channel, the power flow having a higher pressure than the latter and at low temperature, is concentrated in a small section is almost wholly available for the passage and the control of the flow.

This arrangement may offer certain advantages in the case of installation of the engine on aircraft, and results in a very great flexibility of the engine.

Thus, when operating at maximum flow-rate with heat and re-heat, the increase in power is very substantial as compared with normal operation.

At low partial loads, without heat or re-heat, with reduced flow-rate and increased pressure ratio, as the turbine can operate at reduced temperature, the heating of the cold flow of the power channel is effected solely by mixture with the exhaust gases of the turbine. The engine can operate with good efficiency without change in the speed of the compressed-air generator. The working of the compressed-air generator at constant speed under different conditions of flight is advantageous, especially for driving the auxiliary apparatus on board.

For the same reason, this engine is well suited to rapid changes of power.

The description which follows below with the reference to the accompanying drawing, given by way of example and without any implied limitation, will make it quite clear how the invention can be carried into effect, the special features which are brought out either in the text or in the drawing being understood to form a part of the said invention.

The single figure is a diagrammatic longitudinal section of a composite jet engine constructed in accordance with the present invention.

The jet engine shown in the drawing comprises two separate channels 1 and 2, terminating in separate convergent-divergent discharge-nozzles 3 and 4 which are adjustable when stationary and in flight by means not shown. In the example of the drawing, these channels have a common air-intake 5 which is also convergent-divergent and adjustable when stationary and in flight. The line of separation of the two flows comprises, when so required, a movable flap 6 which facilitates the adaptation of the channels to the required distribution of the flow-rates. It is however quite obvious that it is possible to replace the common intake 5 by separate adjustable supersonic intakes for the two channels.

In the channel 1 is housed a compressor 7, the rotor of which is coupled by a shaft 8 to a free turbine 9 working on the downstream side of a gas generator consisting of a compressor 11, a combustion chamber 13 and a turbine 10, the gases being discharged from the adjustable convergent-divergent nozzle 3.

The compressor 7 delivers into a conduit 14 equipped when so required with a valve 15 and a tapping 23. This conduit delivers into a combustion chamber 16 which supplies a turbine 17 coupled by a shaft 18 to a low-pressure compressor 19 which is provided with a device shown diagrammatically at 24 and which permits the changing of the setting of the blades of all or part of the stationary rows such as 25 and 26. The turbo-compressor group 17–19 with the combustion chamber 16 is arranged in the channel 2. An annular channel 20, formed between the casing of this group and the wall of the channel 2 is provided with a heating device 27 located in the flow of air delivered by the low-pressure compressor 19. This air is then mixed with the exhaust gases of the turbine 17 in a chamber 21 equipped with a re-heat device 22 and is finally ejected from the adjustable convergent-divergent discharge nozzle 4.

The invention is not in any way limited to the arrangement of a single channel such as 1 or 2. It may be advantageous to combine one or more channels such as 1 with one or more channels such as 2.

It will of course be understood that modifications may be made to the form of embodiment which has been described above, in particular by the substitution of equivalent technical means, without thereby departing from the scope of the present invention.

What I claim is:

1. A composite jet engine designed for efficient operation in the subsonic as well as highly supersonic range of aircraft speed, comprising a first jet propulsion channel ending rearwardly with an adjustable convergent-divergent nozzle, a second jet propulsion channel ending rearwardly with a further and distinct adjustable convergent-divergent nozzle, at least one adjustable convergent-divergent ramming intake at the fore end of said channels, a combustion chamber within said second channel intermediate the ramming intake and nozzle thereof whereby said second channel is operable substantially along a ram-jet cycle in said supersonic range, a low-pressure compressor in said second channel positioned upstream of said combustion chamber, a turbine drivingly connected to said compressor, a further and separate combustion chamber connected with the inlet of said turbine, a compressed-air generator in said first channel, and an interconnecting conduit extending between said channels for supplying said further combustion chamber with compressed air delivered by said generator whereby said second channel is operable substantially along a turbofan cycle in said subsonic range.

2. An engine as claimed in claim 1, wherein the second channel comprises, upstream of the nozzle thereof, a mixture chamber into which the low-pressure compressor discharges and the turbine exhausts.

3. An engine as claimed in claim 1, further comprising after-burning means positioned downstream of the turbine.

4. An engine as claimed in claim 1, wherein the low-pressure compressor comprises orientable stator blades pivotable about radial axes, and means for adjusting the angular setting of said blades, whereby the output and pressure ratio of said low-pressure compressor is accordingly varied.

5. An engine as claimed in claim 1, wherein the two channels merge with one another at the fore end thereof and have a common adjustable convergent-divergent ramming intake, said engine further comprising distributing means for proportioning the air flow from said common ramming intake, between the two channels.

6. An engine as claimed in claim 5, wherein the distributing means comprise a pivotal flap positioned in the merging zone of said channels.

7. An engine as claimed in claim 1, wherein the compressed-air generator in the first jet propulsion channel comprises an air compressor sucking downstream of the ramming intake, a turbine drivingly connected with said air compressor and having its exhaust connected to the nozzle of said first channel, a motive-gas generator supplying motive-gas to said turbine and nozzle, said generator comprising a gas-turbine unit mechanically independent from said compressor and turbine.

References Cited in the file of this patent

UNITED STATES PATENTS

| | | |
|---|---|---|
| 2,396,911 | Anxionnaz et al. | Mar. 19, 1946 |
| 2,409,177 | Allen et al. | Oct. 15, 1946 |
| 2,501,078 | Newcomb | Mar. 21, 1950 |
| 2,570,629 | Anxionnaz et al. | Oct. 9, 1951 |
| 2,577,919 | Roy | Dec. 11, 1951 |
| 2,618,926 | Pfenninger | Nov. 25, 1952 |
| 2,677,932 | Forsling | May 11, 1954 |
| 2,955,414 | Hausmann | Oct. 11, 1960 |
| 2,988,878 | Hopper | June 20, 1961 |

FOREIGN PATENTS

| | | |
|---|---|---|
| 704,669 | Great Britain | Feb. 24, 1954 |
| 243,957 | Switzerland | Feb. 17, 1947 |